United States Patent
Grobelny et al.

(10) Patent No.: US 10,409,751 B2
(45) Date of Patent: Sep. 10, 2019

(54) SYSTEM AND METHOD FOR ADDING ACTIVE OUT-OF-BAND MANAGEMENT CAPABILITY AS A USER-SELECTABLE MODULE

(71) Applicant: Dell Products, LP, Round Rock, TX (US)

(72) Inventors: Nicholas D. Grobelny, Austin, TX (US); Joshua N. Alperin, Round Rock, TX (US); Marcin M. Nowak, Round Rock, TX (US); Sean P. O'Neal, Austin, TX (US); Akash Malhotra, Cedar Park, TX (US); Ronald D. Malcolm, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 214 days.

(21) Appl. No.: 15/485,073

(22) Filed: Apr. 11, 2017

(65) Prior Publication Data
US 2018/0293197 A1 Oct. 11, 2018

(51) Int. Cl.
*G06F 13/38* (2006.01)
*G06F 1/16* (2006.01)
(Continued)

(52) U.S. Cl.
CPC .......... *G06F 13/385* (2013.01); *G06F 1/1632* (2013.01); *G06F 13/4022* (2013.01);
(Continued)

(58) Field of Classification Search
CPC .. G06F 1/1632; G06F 13/385; G06F 13/4022; G06F 13/4081; G06F 13/4282; G06F 13/4291; G06F 2213/0026
See application file for complete search history.

(56) References Cited

U.S. PATENT DOCUMENTS

2016/0285757 A1* 9/2016 Srivastava .............. H04L 12/10
2018/0239718 A1* 8/2018 Jabori ................. G06F 13/4295
2018/0246830 A1* 8/2018 Zhu ....................... G06F 13/385

OTHER PUBLICATIONS

Wikipedia Foundation, Inc., "Intel Active Management Technology," 11 pages, Dec. 17, 2016, https://en.wikipedia.org/wiki/Intel_Active_Management_Technology.
(Continued)

*Primary Examiner* — Eric T Oberly
(74) *Attorney, Agent, or Firm* — Prol Intellectual Property Law, PLLC; H. Kenneth Prol

(57) ABSTRACT

A method and information handling system including a first universal serial bus (USB) type C port for transceiving SMBus data multiplexed over unused USB-2 pins from a host information handling system, a first multiplexer for demultiplexing the SMBus as a designated data bus to a second multiplexer to create a designated bus for management controller transport protocol data, the second multiplexer re-multiplexing the SMBus designated bus to a second USB type C port for connection with an out-of-band management hardware system network interface card of a device connected to the second USB type C port for communication of management controller transport protocol data with the information handling system host and bypassing a docking station high capacity connector multiplex controller, and an embedded controller for activating the first multiplexer and the second multiplexer upon detecting the connection with the out-of-band management hardware system network interface card via the second USB type C port and establishing the designated data bus for management controller transport protocol data bypass connection.

20 Claims, 5 Drawing Sheets

(51) Int. Cl.
*G06F 13/40* (2006.01)
*G06F 13/42* (2006.01)

(52) U.S. Cl.
CPC ...... *G06F 13/4081* (2013.01); *G06F 13/4282* (2013.01); *G06F 13/4291* (2013.01); *G06F 2213/0026* (2013.01)

(56) References Cited

OTHER PUBLICATIONS

Wikipedia Foundation, Inc., "Intel vPro," 10 pages, Jan. 9, 2017, https://en.wikipedia.org/wiki/Intel_vPro.
Wikipedia Foundation, Inc., "USB-C," 7 pages, Feb. 16, 2017, https://en.wikipedia.org/w/index.php?title=USBC&oldid=765815321.
Wikiwand W from Wikipedia Foundation, Inc., "Thunderbolt (interface)," 16 pages, Feb. 17, 2017, http://www.wikiwand.com/en/Thunderbolt_(interface)#/Thunderbolt_3.
Intel Corporation, "Thunderbolt 3—The USB-C That Does It All," 4 pages, Jun. 1, 2015, https://thunderbolttechnology.net/blog/thunderbolt3usbcdoesitall.

* cited by examiner

SYSTEM AND METHOD FOR ADDING ACTIVE OUT-OF-BAND MANAGEMENT CAPABILITY AS A USER-SELECTABLE MODULE

FIELD OF THE DISCLOSURE

The present disclosure generally relates to information handling systems, and more particularly relates to out-of-band remote management for information handling systems for connection via docking station systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components. Additionally, the information handling system may include one or more network ports or I/O ports for connection to additional devices and networked systems.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
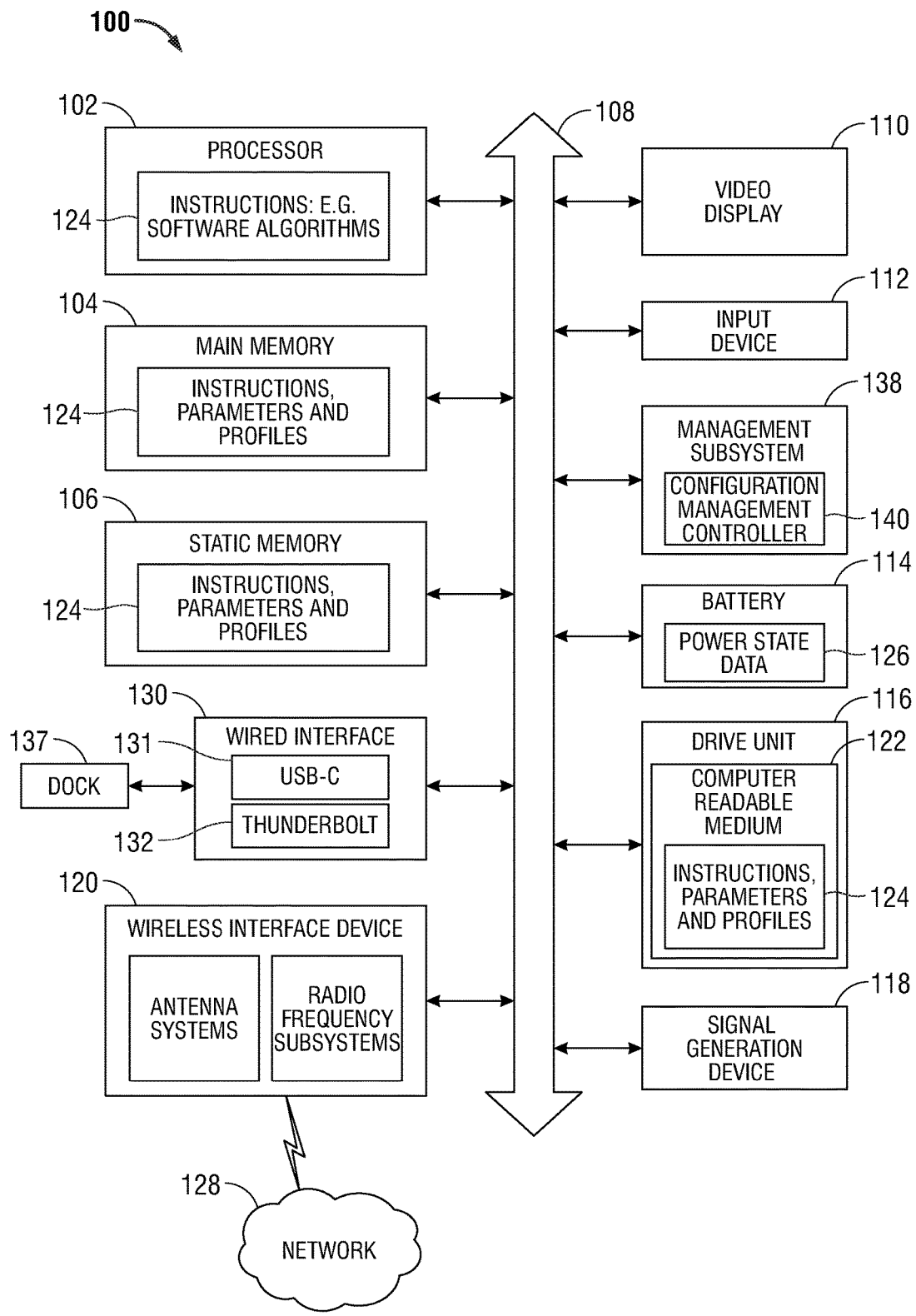
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Monitoring and maintenance activity on an information handling system (IHS) may occur for purposes of updating, upgrading, or repairing software, firmware and systems in the information handling system. Monitoring and maintenance activity is routinely needed for information handling system and increasingly occurs via remote access. Monitoring and maintenance may be software-based via software based agents or may be out-of-band hardware management. These out-of-band management systems operate via communication channels such as within the TCP/IP stack to establish communication channels with an information handling system. Frequently, the out-of-band or hardware-based management system do not require an operating system or a locally installed software management agent. In many embodiments however, out-of-band management systems may operate in connection with a software management application as well. Further, the designated out-of-band management system operates on a designated communication channel that operates regardless of power state of an information handling system, the state of hardware systems in the information handling system, or the operation of an operating system. Thus, Thunderbolt or similar multiplexed controllers are not needed online for management of out-of-band management activity but such data may be transmitted and received nonetheless over the same connector. In the event of an inoperable state of the information handling system and the Thunderbolt system, the out-of-band management is still available through the docking station. The out-of-band management system may be communicated via a management controller transport protocol and may operate on a designated encrypted channel.

As will be discussed further below, the out-of-band management system designated channel may be multiplexed into a wider multiplexed data stream for transport out or in via a single network or I/O port along with multiple other types of data. An example of a high volume data multiplexing technology to utilize a single data port include the Thunderbolt port technology. For example, Thunderbolt 3 may utilize a Universal Serial Bus (USB) type C port for communication of multiple lanes of data including Peripheral Component Interconnect Express (PCIE) data, DisplayPort video data, audio data, as well as management controller transport protocol data via a single USB-C connector. Additional discussion of these technologies are described below.

In one example embodiment of the present disclosure, some host information handling systems may need to be used with a docking station with which it may be desirable to support wired out-of-band management such as vPro technology but such capability may not be supported within Thunderbolt connector protocol by the host information handling system. The docking station of the present disclosure may be utilized to provide broad functionality to a variety of connected information handling systems connected through the docking stations USB type C connector. In an aspect, information handling systems that do not support vPro or other wired out-of-band management through Thunderbolt may nonetheless desire wired connectivity to a vPro or out-of-band administrator. An alternative may be wireless wired out-of-band management or vPro connectivity such as through WiFi, however such connectivity may not have sufficient bandwidth to support some wired out-of-band management or vPro features.

Thus, the docking station of the present disclosure may enable wired out-of-band management without the necessity of connecting that data through the Thunderbolt connection protocol in an example embodiment. In aspects of the present disclosure, a bypass connection in the docking station may be activated to establish a designated MCTP data bus connection between a host information handling system and a non-Thunderbolt wired out-of-band management communicator device through the docking station. In one embodiment, the bypass connection around a Thunderbolt controller may be made upon determination that a device enabling wired out-of-band management communication has been connected to another connector on the docking station. In a further aspect, detection of the presence of a vPro PCIE network interface device in the device or system connected to the docking station may indicate that wired out-of-band management communication is necessary. For example, a plug in event may indicated to the docking station that the vPro PCIE network interface device has been connected. In an example embodiment, a vPro dongle having a vPro PCIE network interface device therein may be connected to enable wired out-of-band management in some instances. The docking station of the present disclosure may have the capability to accommodate a wider selection of host information handling systems for regular USB, display or other data connectivity through the USB type C port as well as wired out-of-band management if desired. The present disclosure offers embodiments that are cost efficient yet provide expanded capability for the docking station system. Several embodiments and aspects are discussed further herein.

FIG. 1 illustrates a generalized embodiment of information handling system 100. As described, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

FIG. 1 shows an information handling system 100 capable of administering each of the specific embodiments of the present disclosure. The information handling system 100 can represent the host client information handling systems such as 310 of FIG. 3 or servers or systems located anywhere within a network. Information handling system may represent a remote data center operating virtual machine applications or user information handling systems as described herein. The information handling system 100 may also execute code 124 for a hardware based, out-of-band remote monitoring and management system utilized by an administrator to remotely manage and repair a host information handling system. In other aspects information handling system 100 may execute code 124 to operate a software agent or may execute firmware of a management engine such as an Intel® management engine to enable out-of-band or hardware based management and remote communication with an active management system on the information handling system. Management engine firmware may reside or operate via a secondary processor that may be part of the CPU chipset 102 or be operatively connected to CPU such as a platform controller hub operating as a secondary processor or controller. Remote management of a host information handling system may occur through a designated remote management communication channel that may operate from servers or systems or remote data centers that may be information handling system 100 according to various embodiments herein.

The information handling system 100 may include a processor 102 such as a central processing unit (CPU), a graphics processing unit (GPU), control logic or some combination of the same. Any of the processing resources may operate to execute code that is either firmware or software code. Moreover, the information handling system 100 can include memory such as main memory 104, static memory 106, and drive unit 116 (volatile (e.g. random-access memory, etc.), nonvolatile (read-only memory, flash memory etc.) or any combination thereof). Additional components of the information handling system can include one or more storage devices such as static memory 106 and drive unit 116. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display unit 110, such as a liquid crystal display (LCD), an organic light emitting diode (OLED), a flat panel display, a solid state display, or other display technology. Additionally, the information handling system 100 may include an input device 112, such as a keyboard, and a cursor control device, such as a mouse, touchpad, or gesture or touch screen input. The information handling system 100 can also include a signal generation device 118, such as a speaker or remote control. One or more of the above devices may be external peripheral devices that are connected through a docking station to the host information handling system according to embodiments herein. The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment. A plurality of information handling systems may also be connected according to some embodiments via network connectivity through a docking station of the present disclosure.

The information handling system 100 can include a set of instructions 124 that can be executed to cause the computer system to perform any one or more of the methods or computer based functions disclosed herein. For example, information handling system 100 includes one or more application programs 124, and Basic Input/Output System and Firmware (BIOS/FW) code 124. BIOS/FW code 124 functions to initialize information handling system 100 on power up, to launch an operating system, and to manage input and output interactions between the operating system and the other elements of information handling system 100. In a particular embodiment, BIOS/FW code 124 reside in memory 104, and include machine-executable code that is executed by processor 102 to perform various functions of information handling system 100. In another embodiment, application programs and management engine firmware code may reside in another storage medium of information handling system 100. For example, application programs and BIOS/FW code can reside in static memory 106, drive 116, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive 116 or in a storage system (not illustrated) associated with network channel 120 or any combination thereof. Application programs 124 and BIOS/FW code 124 can each be implemented as single programs, or as separate programs carrying out the various features as described herein. Application program interfaces (APIs) such Win 32 API may enable application programs 124 to interact or integrate operations with one another.

In another example of the present disclosure, instructions 124 may execute management engine firmware code that may reside in another storage medium of information handling system 100 such as a platform controller hub which may be represented the management subsystem 138 and include the configuration management controller 140. In yet other embodiments, devices such as in a docking station 137, may have an embedded controller to execute instructions such as 124 stored in non-volatile memory for determining if a out-of-band remote management capable device has been connected before establishing a designated management controller transport protocol bus for out-of-band remote management communication as disclosed in embodiments herein. Additionally, instructions 124 may execute the information handling system management engine system, such as Intel® vPro as disclosed herein via a host PCH and a out-of-band remote management device for connection to an administrator system for remote management and repair activities and include firmware systems and device drivers and other aspects of the information handling system and software instructions 124 of embodiments herein. In a further example, processor 102 may conduct processing of component device power utilization data by the information handling system 100 according to the systems and methods disclosed herein. The computer system 100 may operate as a standalone device or may be connected, such as via a network, to other computer systems or peripheral devices. For example, a docking stations 137 may connect via a wired interface 130 to enable a plurality of peripheral devices to be connected as well as remote out-of-band management connectivity to be established.

Main memory 104 may contain computer-readable medium (not shown), such as RAM in an example embodiment. Static memory 106 may contain computer-readable medium (not shown), such as NOR or NAND flash memory in some example embodiments. The disk drive unit 116 may include a computer-readable medium 122 such as a magnetic disk in an example embodiment. The computer-readable medium of the memory and storage devices 104, 106, and 116 may store one or more sets of instructions 124 such as firmware, management engine firmware, or software code corresponding to the present disclosures.

In a particular embodiment, the instructions, parameters, and profiles 124 may reside completely, or at least partially, within the main memory 104, the static memory 106, disk drive 116 and/or within the processor 102 during execution by the information handling system 100. Software applications may be stored in static memory 106 or disk drive 116. In an embodiment such as a docking stations 137 with embedded controller functionality, firmware instructions may be stored in memory such as 106 and 116 thereon for execution of instructions to establish a designated management controller transport data bus wired bypass for remote out-of-band management communications.

The information handling system may include a power source such as battery 114 or an A/C power source. Battery 114 may include a smart battery system that tracks and provides power state data 126. This power state data 126 may be stored with the instructions, parameters, and profiles 124 such as component device utilization data to be used with the systems and methods disclosed herein.

The information handling system may also have a management subsystem 138 with a plurality of information handling system subsystems for control of a plurality of systems. For example, a platform controller hub may coordinate the configuration of the information handling system and may operate the management engine via a configuration management controller 140 such as for the out-of-band remote management communication for activity such as monitoring, maintenance, repair, upgrades or updates to the host information handling system 100. Access may be made via the platform controller hub to other elements shown in FIG. 1, for example, via one or more buses 108. In some aspects, system-level events, component-level events, system-level operation, and component-level operation may be monitored and maintained via the configuration management controller 140. In some aspects where applicable, execution of configuration policy may be provided and administered partially via out-of-band remote maintenance activity through the configuration management controller 140.

The information handling system 100 can also include a network interface device that may be wired network adapter 130 or may be a wireless adapter 120 as shown. Wireless network interface devices will include antenna subsystems 132 and radio frequency control subsystems 130 which may work in connection with the management subsystem 138. As a wireless adapter, network interface device 120 can provide connectivity to a network 128. Radio frequency subsystems 130 and antenna subsystems 132 may include transmitter/receiver circuitry, wireless controller circuitry, amplifiers and other circuitry for wireless communications. Each radiofrequency subsystem 130 may communicate with one or more wireless technology protocols.

A wired network interface 130 is also contemplated. Wired interface 130 may similarly be an I/O connector for connectivity via a connector with network devices or I/O devices. Wired interface 130 may support one or more wired connectors such as a USB-C connector 131 as shown in the example embodiment. Wired interface 130 may also be capable of transceiving a plurality of multiplexed data formats to allow several data lines to utilize the connector 131. For example, a Thunderbolt protocol 132 may be utilized and multiplexed for transceiving activity across connector 131 of the wired interface. For example, a Thunderbolt protocol may support transmission across connector 131 that includes PCIe data, DisplayPort data, audio data or other data types. Additional protocols may be multiplexed for transceiving data including system management bus data (SMBus) data for providing updates to peripheral devices as well as for establishing a management controller protocol data bus for designation for out-of-band remote management operations as according to embodiments described.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2A:
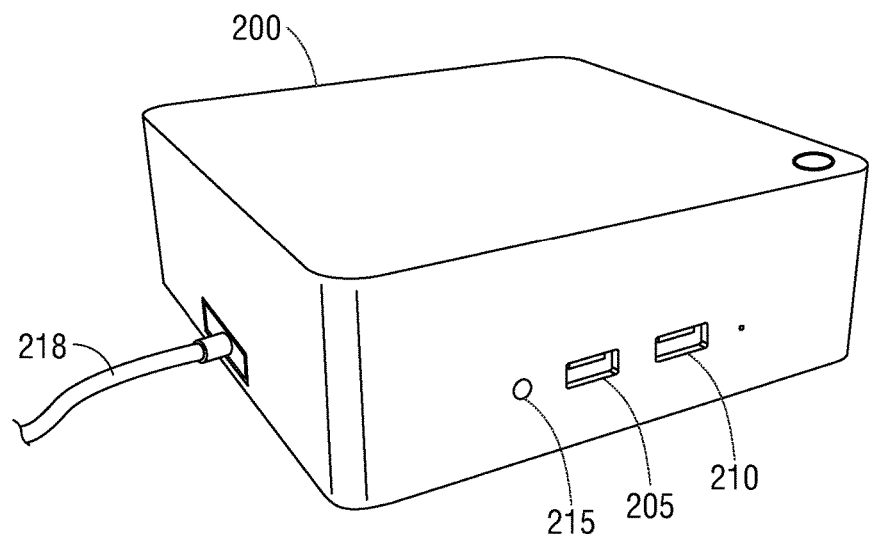
FIG. 2A is an illustration of an isometric view of a docking system according to an embodiment of the present disclosure.

FIG. 2A illustrates an isometric view of a docking station 200 according to an embodiment of the present invention. In an example embodiment, docking station 200 may be similar to a Dell® Thunderbolt Dock. Docking station 200 may be used to plug in a host information handling system such as a laptop computer system for port replication activity and expansion of available ports for attachment of a variety of peripheral devices through one or more wired ports on the information handling system. Docking station 200 may have numerous display connectors, audio connectors, a plurality of USB hub connectors, and other connectors. Additionally, in some embodiments, power may be provided via a docking station system to a host information handling system.

In a front isometric view of docking station 200 shows several front connectors. For example a headset jack is shown at 215. Further two USB 3.0 ports are shown at 205 and 210. Also shown is a power LED. Also on the front view is shown a Dell docking station connector 218 for connection to a host information handling system. In an example embodiment, the Dell docking station connector may be a proprietary connector which may connect to a host information handling system via USB type C connector at the host device end (not shown).

Figure 2B:
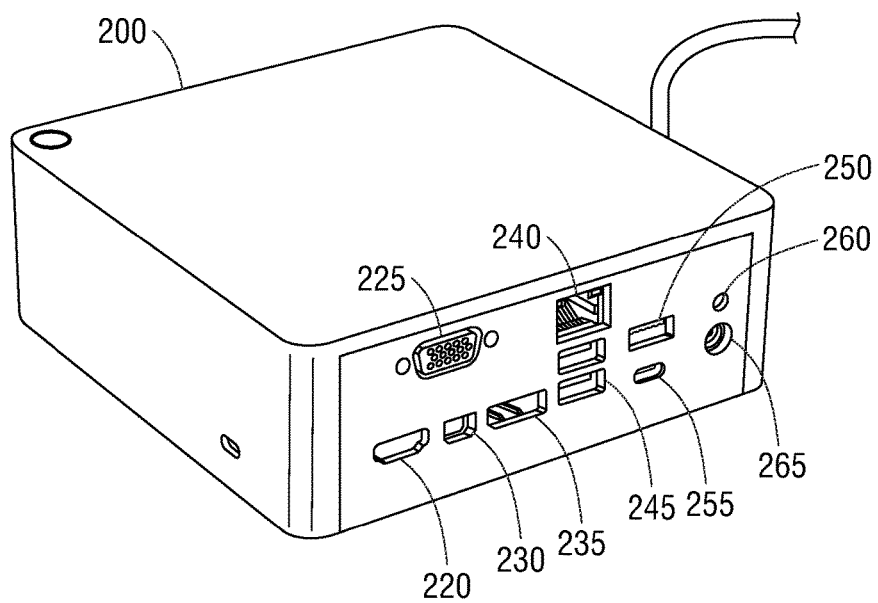
FIG. 2B is an illustration of another isometric view of a docking system according to an embodiment of the present disclosure.

FIG. 2B illustrates another isometric view of a docking station 200 according to an embodiment of the present invention. Docking station 200 is shown as having a plurality of additional connector options from the back view in an embodiment. Docking station 200 includes a High Definition Multimedia Interface (HDMI) interface at 220. At 225, a Video Graphics Array (VGA) port is depicted. The docking station 200 also has a Mini-DisplayPort (mDP) connector 230 and a DiplayPort (DP) connector 235. Thus, a plurality of wired video ports are made available.

At 240, docking station 200 has an RJ-45 Gigabit network port. 245 shows two USB ports. These back mounted USB ports may be USB 2.0, USB 3.0 or other USB type ports. Docking station 200 has yet another USB port 250 which may be any type of USB port. At 255, docking station 200 has a USB type C port 255. Additionally shown is a DC power connector 10 for docking station 200 as well as audio out speaker jack 265. Also a power on button or wake from sleep button for the docking station is shown on the top of the docking station console.

In an example embodiment, an additional USB type-C connector may be installed (not shown) that may be made available for establishing a designated management controller transport protocol bus when a out-of-band remote management capable device is connected there according to embodiments of the present disclosure. The additional USB type-C connector may be available for connection of an out-of-band remote management device such as a vPro dongle device to enable connectivity from a remote administrator for monitoring and maintenance of a host information handling system connected through the docking station 200. In an example embodiment, the connection of the remote administrator through out-of-band remote management may avoid the Thunderbolt or other multiplexing/demultiplexing controller supported by the docking station 200 and establish a designated management controller transport protocol data bus through to the host information handling system platform controller hub according to some embodiments.

Figure 3:
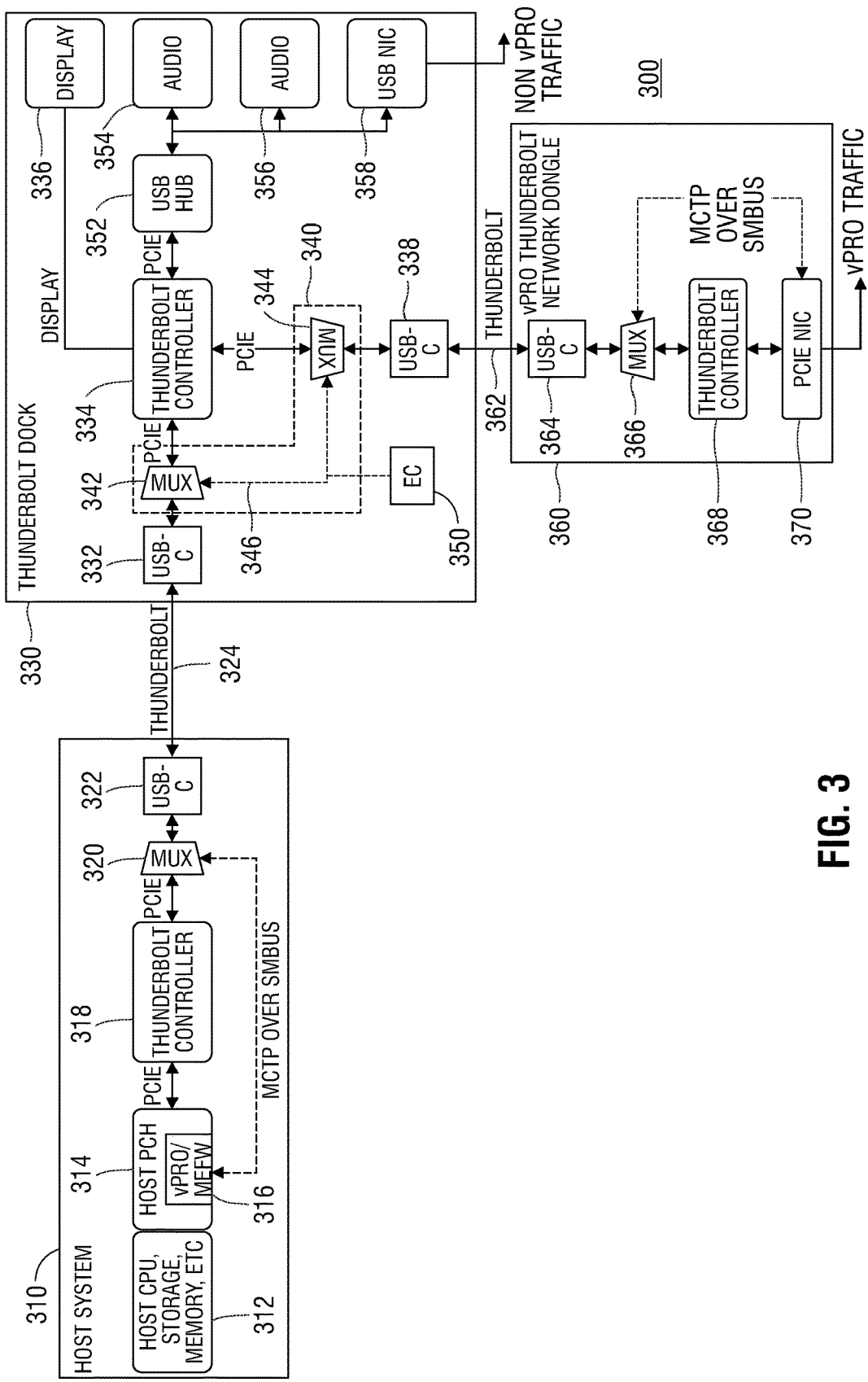
FIG. 3 is a block diagram illustrating a docking system connected with a host information handling system and having further connection with active out-of-band management access according to an embodiment of the present disclosure.

FIG. 3 illustrates a block diagram of a multi-device connection 300 of a host information handling system 310 operatively connected to a docking station 330 according to an embodiment of the present disclosure. In another aspect, a vPro network dongle 360 is also connected to docking station 330 and may enable wired out-of-band management communication (e.g., vPro traffic) with a system administrator for information handling system host system 310.

An example embodiment of out-of-band or hardware based management of information handling systems includes Intel® Active Management Technology or AMT. In many information handling systems, Intel Core® central processors are used. As shown in FIG. 3, host information handling system 310 may include a host central processing unit (CPU) 312 as well as storage, memory and several additional components as described above for an embodiment of an information handling system. With the Intel Core® processors, information handling systems may have a chipset including a host platform controller hub (PCH) 314 which includes AMT as part of Intel Management Engine 316 which is included in Intel vPro Technology® in the information handling system 310. The out-of-band management systems, such as AMT, uses a designated communication channel such as SMBus that operates regardless of a working operating system or software management agent and is independent of the systems power state or the state of hardware components such as hard disk drives or memory. The designated communication channel for out-of-band management may further be encrypted.

In an example embodiment, an Intel vPro AMT capability may reside in management engine firmware (MEFW) 316 at a host PCH 314. The out-of-band communications may occur according to management controller transport protocol (MCTP) via an SMBus as shown in host information handling system 310 and which may extend onto the Thunderbolt bus via multiplexer 320. Host CPU and other systems 312 and host PCH may communicate other data including I/O data for peripheral devices, network communication data, display data, audio data or other data as understood to be communicated via a PCIE connection and multiplexed onto a high capacity bus and interface system such as a Thunderbolt connection.

With thinner and thinner information handling systems having fewer network and I/O ports being developed, higher capacity network bus systems have been developed for connectors to information handling systems. In an example embodiment, a Thunderbolt hardware interface may be used to provide for capacity to transport multiplexed PCIE, display data such as in DisplayPort format, audio data, types of network data and communications. In an example embodiment, the high capacity connector system such as Thunderbolt provides for connection and operation of multiple external peripherals to an information handling system. Those several external peripheral devices, as well as other data including network and communication data, may support the connection and operation of multiple external peripherals, displays, speakers or microphones, and the like via a single connector. In an example embodiment, Thunderbolt 1 and 2 connector systems and bus systems may utilize a mini-DisplayPort connection and cabling. In another example embodiment as shown in FIG. 3, the high capacity connector 322 may be a USB Type C connector as supported by Thunderbolt 3. For a Thunderbolt connection via cabling 324 and between two connectors such as 322 and a connector 332 located on a peripheral device such as a docking station 330, Thunderbolt controllers or another controller of a high capacity bus and connector system for peripheral devices may be used to provide for multiplexing and demultiplexing data transmitted between a host and a peripheral device. Host 310 is shown having a Thunderbolt controller 318. Docking station 330 is shown having another Thunderbolt controller 334 operatively connected to connector 332. In an embodiment, connector 332 of the docking station 330 is a USB Type C connector.

Data via PCIE may be connected through a Thunderbolt controller 318 or other high capacity bus protocol for communication via a high capacity connector 322. In an example embodiment, the high capacity connector may be a USB type C connector 322 such as may be used with a Thunderbolt 3 connection. MCTP data may be multiplexed with the Thunderbolt multiplexed PCIE and other data at 320 and communicated across the high capacity connector 322 and cabling 324. In an example embodiment, the MCTP data for remote management capability is multiplexed at multiplexer 320 after the PCIE, display data, or other data is multiplexed and established for the Thunderbolt connector system at Thunderbolt controller 318.

Cabling 324 may be a Thunderbolt cable including several pins that may be capable of including the multiplexed MCTP data to extend a designated bus for out-of-band remote management for the host information handling system 310 through to docking station 330. This designated bus may be established independent of the Thunderbolt connection to support connectivity of MCTP data and communications via the designated MCTP bus without the necessity of utilizing the Thunderbolt connectivity or connector protocol. A bypass connection 346 may be established via multiplexer 342 and multiplexer 344 to continue the designated MCTP bus 340 without the need for the MCTP data to be received and processed at the Thunderbolt or other high capacity connector system controller 334. Embedded controller (EC) 350 may activate multiplexers 342 and 340 to route MCTP data around the high capacity connector controller 334 to a second high capacity connector 338 in docking station 330. Activation of the bypass connection 346 extending the MCTP bus bypass 340 by embedded controller 350 may still allow PCIE, display data, network data or other Thunderbolt data to be routed through Thunderbolt controller 334 also to USB Type C connector 338 for connectivity to peripherals connected to the docking station 330 at that connector. In an example embodiment, multiplexers 342 and 344 may be an I2C bus switch that may be activated via command from embedded controller 350. MCTP data may be transported on I2C pins located with USB 2.0 supported capability by connector cable 324 to connector 322 of the docking station 330. For example, SMBus data may be multiplexed over unused USB-2 pins in the USB type C port.

In additional aspects, high capacity connector system controller 334 may demultiplex received data such as Thunderbolt data and separate that data to pass through for one or more display connectors 336 which may be connected to an external display device, as well as passing through PCIE data to a USB hub 352 for further demultiplexing to additional connectors including audio connectors 354 and 356 which may be connected to speakers or microphones, or to one or more USB streams of network interface traffic for connection to one or more USB connectors 358 which may be connected to a variety of external peripherals including cursor control devices, keyboards, external memory or storage or other external peripherals understood as well as other information handling systems. Several USB connectors may be available on the docking station 330 including USB 2, USB 3, USB type C or other USB standard connectors as understood and available for use with information handling system and peripheral devices. In one example embodiment, data connected through to one or more USB connectors 358 for connection to one or more external devices may include non-MCTP data (non vPro traffic) such that remote management data and communications is not conducted via these USB ports. It is understood that the Thunderbolt controller 334 or other high capacity connector system controller may also multiplex data received from display devices and PCIE data from connected USB connectors, audio connections, or the like and communication and data transfer on the Thunderbolt connector system with host information handling system is conducted in both directions.

In yet other embodiments, some Thunderbolt connector system data may be passed through the docking station 330 by Thunderbolt controller 334 in some embodiments. This data may be routed to high capacity connector 338 to be passed through including PCIE data, display data or the like or may be routed to another high capacity connector (not shown) on the docking station 330 in other embodiments. Such high capacity connector system data, such as Thunderbolt connector data, may pass through the additional high capacity connector to a connected remote peripheral device having a high capacity connector system controller or Thunderbolt controller to multiplex or demultiplex the data for communication via the Thunderbolt connector system with the controller 334 in the docking station 330. It is understood that data may be multiplexed or demultiplexed for communication in either direction: either to the docking station 330 or from the docking station 330 via the Thunderbolt or other high capacity connector system controllers.

Second high capacity connector 338 in docking station 330 may be connected to additional external devices including external peripheral devices, other information handling systems or the like. In an example embodiment, a vPro network dongle 360 external device may be connected to the second high capacity connector 338 via a Thunderbolt or other high capacity cabling 362. In the example embodiment, vPro network dongle 360 is connected via an USB type C cable between the second USB type C connector 338 of docking station 330 and USB type C connector 364 of vPro network dongle 360. The vPro network dongle 360 also may have a Thunderbolt or other high capacity connector system controller for receiving Thunderbolt data via connector 364. However, vPro network dongle 360 may also accommodate the designated MCTP bus and demultiplex the MCTP or vPro data at multiplexer 366. In an example embodiment, multiplexer 366 may be an I2C bus switch or other multiplexer device understood by those of skill.

PCIE network interface 370 may connect to the MCTP designated bus via an SMBus connection to multiplexer 366 in vPro network dongle 360 to enable connection of remote management control traffic or vPro traffic to be connected through the docking station to the host information handling system. The PCIE network interface 370 may be a traditional Intel wired PCIE vPro network interface device to enable legacy vPro connectivity rather than via the Thunderbolt connector system including a USB type C connector. With the current USB type C connector however, no sideband or C-link signals are available to support the prior versions of vPro for connectivity to the host chipset to enable remote active management. Remote active management or AMT via vPro is not optimal or available without the C-Link signaling unless a host information handling system is Thunderbolt enabled which would allow for signaling via the SMBus over the Thunderbolt connector. In an embodiment, the SMBus traffic may be transmitted across unused USB 2 wires or pins in the USB type C connector depending on the orientation of the cable and connector. Of the four available pins for USB 2 in a USB type C connector only two get used at a time depending on the orientation and thus the unused pins may be utilized for the MCTP SMBus traffic in some aspects of the current disclosure.

For non-Thunderbolt enabled host information handling systems for vPro or other remote active management technology, the docking station should still support the C-Link signaling and permit operation via the designated MCTP bus 340. The designated MCTP bus 340 supports out-of-band remote management such as vPro capability without needing to be Thunderbolt enabled for the vPro operation. In some embodiments the designated MCTP bus operates on an SMBus and, as in the shown embodiment, the multiplexers 342 and 344 in the docking station allow the SMBus to be a designated MCTP bus link 346 to route remote active management communications and data from the PCIE NIC in the vPro dongle all the way to the host information handling system embedded PCH controller 314 and the management engine 316. The host information handling system in a current embodiment that is not Thunderbolt enabled will support multiplexing of USB 2.0 and SMBus on the USB type C connector USB 2.0 pins. The SMBus multiplexed on the USB 2.0 pins may also be multiplexed to carry data such as updates and similar data for the embedded controller in the docking station 330. It is understood that different data streams may be multiplexed with the SMBus in an embodiment. With the disclosed solution, full wired remote active management capability, such as vPro, may be available for users with host systems requiring such out-of-band remote active management. The SMBus may operate as a designated MCTP bus, including the portion 340 with bypass 346.

vPro dongle 360 may have a Thunderbolt controller 368 which operates in endpoint mode, however the presence of a vPro PCIE NIC 370 may be detected upon plug-in at the docking station 330 at the second USB type C connector 338. The SMBus routes MCTP data from the vPro PCIE NIC 370 to multiplexer 366 in the vPro dongle 360. The vPro dongle 360 may function with the Thunderbolt interface but not have vPro function through Thunderbolt. The detection of the vPro PCIE NIC 370 or similar MCTP interface controller in a connected device triggers the bypass designated MCTP bus 340 via multiplexers 344 and 342 to bypass vPro or similar management data and communications from the Thunderbolt controller 334 and directly to PCH controller 314 in the host device. Utilization of such a system to bypass the Thunderbolt controller in the docking station is low cost yet preserves full wired vPro or similar active management functionality to host information handling systems that require such management and maintenance out-of-band from a remote administrator. Accordingly, the docking station 330 provides for flexible operation for users if bypassing the Thunderbolt controller for wired vPro functionality is needed when connected via a vPro dongle for wired active management communication and data. This permits legacy host information handling systems without Thunderbolt vPro capability interfacing with a USB type C docking station to operate with fully wired vPro or other remote active management which provides for higher bandwidth in an embodiment. In an aspect, this further permits a full set of vPro functionality to the host information handling system. For example, Admin Control Mode is enabled whereas an alternative connection for such a host information handling system user would be with a WiFi connected vPro connection as an alternative. Such a WiFi vPro connection, if wired is unavailable, may not have sufficient bandwidth to support such a feature as Admin Control Mode.

Making available a designated bus for SMBus (MCTP) data and communications out-of-band without passing through a Thunderbolt controller provides for a sideband channel available regardless of the operability state of the information handling system. A remote administrator may utilize MCTP for remote management functions such as via vPro while an information handling system is inoperable such as being off, asleep, OS system failure or normal system devices or controllers (e.g., an Ethernet controller) may be not functioning. Nonetheless in these scenarios a remote administrator may still access the management engine firmware to conduct operations. For example, an administrator may want to remotely collect inventory information or securely wake the system to diagnose a problem that was logged at an earlier time prior to the information handling system being turned off or entering a sleep state such as overnight in some embodiments. In other embodiments, a remote administrator may us out-of-band channels to conduct remote management activity to diagnose failures or even conduct repair to operating system images or the like if there has been an OS failure or some system devices are non-functioning. Thus, the alternative designated bus for MCTP data and communications via the current embodiments of the docking station provide for this alternative path even if Thunderbolt communications are not available.

Figure 4A:
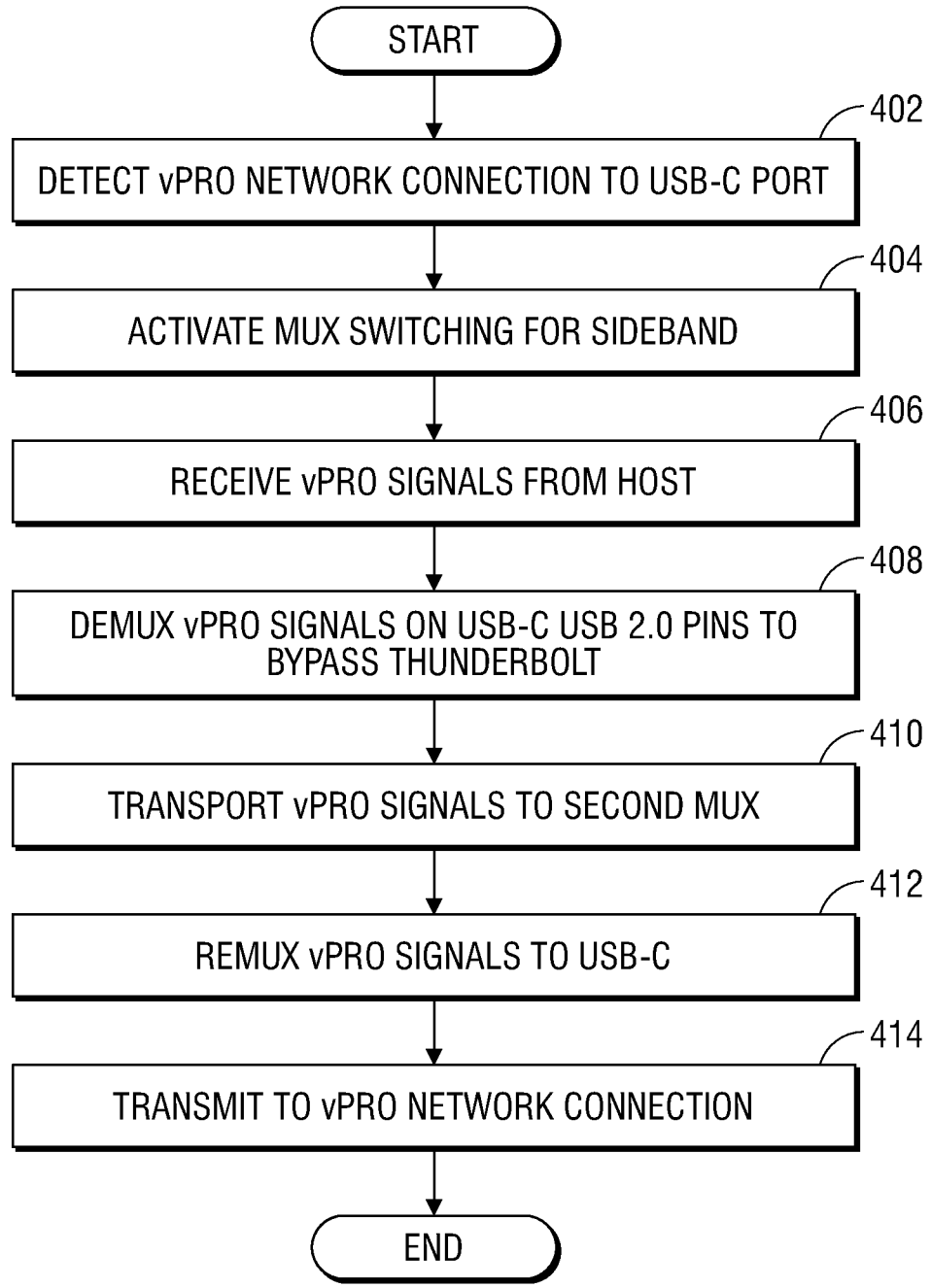
FIG. 4A is a flow diagram illustrating a method of determining module communication selection for active out-of-band management path in a docking system according to an embodiment of the present disclosure.

FIG. 4A is a flow diagram illustrating a method of designating an MCTP data bus bypass of a Thunderbolt controller in a link of a docking station when an remote active management PCIE NIC is connected to the docking station according to an embodiment of the present disclosure. In an aspect, FIG. 4A illustrates an embodiment of a host information handling system interacting with a vPro dongle via an intermediate docking station and enabling a designated MCTP data bus bypass link. In a further aspect, the designated MCTP data bus with a PCH controller in a host information handling system may be an SMBus that bypasses the Thunderbolt controller when wired vPro or similar remote active management is necessary without connection through Thunderbolt.

The method begins at 402 where the docking station may detect a PCIE NIC for remote active management technology such as vPro connected to a USB type C or other high capacity connector of the docking station. In an example embodiment, signaling may be sent to detect if a vPro or similar PCIE NIC is attached for out-of-band remote management communication in the connected device to the high capacity connector. In another embodiment, the device detection and identification under the plug and play aspects of the USB standard for type-C and other USB connections may identify the presence of a vPro or similar PCIE NIC for remote active management communication as understood by those of skill.

At 404, receipt of the identification of a vPro or similar PCIE NIC in an attached device at the USB type C connector of the docking station will trigger an embedded controller to execute instructions to activTe multiplexer switching to bypass the Thunderbolt controller in the docking station for sideband SMBus data such as vPro or other out-of-band active management signals. The MCTP vPro or other out-of-band active management signal data will be routed around the Thunderbolt controller via a plurality of multiplexers activated by the indication of the vPro PCIE NIC.

At 406, the host information handling system may provide vPro or other out-of-band active management signals via a USB type C connector to the docking station for transmission to a vPro dongle or similar device enabling wired out-of-band active management communication with the host device. The vPro or other out-of-band active management signals will be provided via a high capacity cable connection to a multiplexer in the docking station. In the previous example, multiplexer 342 receives the vPro communication and data from the USB type C connector and ultimately from the host information handling system PCH controller in an embodiment. At 408, the vPro or other out-of-band active management signals are demultiplexed at the multiplexer from USB type C USB 2.0 pins which support the SMBus from the PCH controller of the host information handling system. At 410, the vPro or other out-of-band active management signals are removed from the USB type C bus in the docking station and routed to a second multiplexer on the bypass connection. Such a bypass connection may be a conductive trace on PCB or a wire or other conductor suitable for the SMBus signaling between the first and second multiplexer in the docking station. In some embodiments, a plurality of conductive traces or wires may be used. In the example of FIG. 3, the bypass connection 346 may be used to transport the bypassed SMBus data for the designated MCTP bus between multiplexers 342 and 344. The multiplexers, as stated above, may be I2C bus switches in an example embodiment.

At 412, the second multiplexer may remultiplex the vPro or other out-of-band active management signals on the designated MCTP bus onto the USB type C bus that may also carry Thunderbolt data. Such vPro or other out-of-band active management signals may be remultiplexed onto the USB 2.0 pins of the USB type C connector for transport across a single cable to the connected device supporting out-of-band remote management operations such as vPro ATM with the host information handling system.

At 414, the vPro or other out-of-band active management signals may be transmitted across the primary USB type C connector and cabling to the vPro or similar dongle for further upstream vPro network connection according to an embodiment. In a further aspect, the transmitted vPro or other out-of-band active management signals may then be received by the vPro dongle and demultiplexed and communicated along the continued designated MCTP bus to the vPro or similar PCIE NIC for further vPro or similar out-of-band active remote management communication to an administrator system. It is understood that two-way communication of out-of-band active management data between the PCH controller of a host information handling system and a vPro or similar PCIE NIC may be communicated across the designated MCTP bus on the SMBus bypass connection in the docking station according to several embodiments.

Figure 4B:
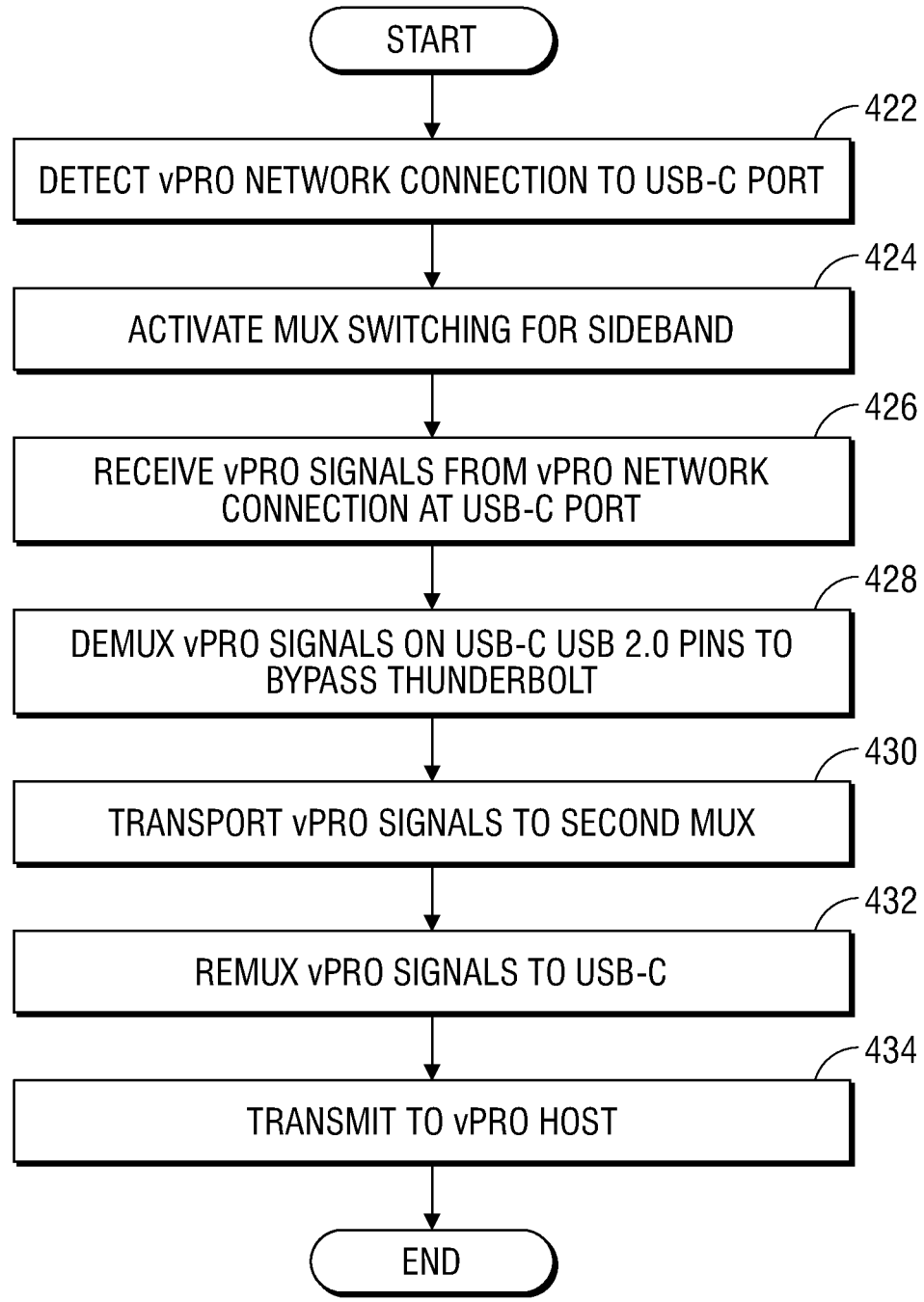
FIG. 4B is a flow diagram illustrating a method of determining module communication selection for active out-of-band management path in a docking system according to an embodiment of the present disclosure.

FIG. 4B is a flow diagram illustrating another method of docking station designation of an MCTP data bus bypass of a high capacity connector system controller according to another embodiment of the present disclosure. In a aspect, the designation of the MCTP data bus bypasses the Thunderbolt controller when an remote active management PCIE NIC is connected to the docking station according to an embodiment of the present disclosure. In an aspect, FIG. 4B illustrates an embodiment of a host information handling system interacting with a vPro dongle via an intermediate docking station and enabling a designated MCTP data bus. In a further aspect, the designated MCTP data bus with a PCH controller in a host information handling system may be an SMBus that bypasses the Thunderbolt controller when wired vPro or similar remote active management is necessary without connection through Thunderbolt. According to an embodiment, MCTP data communication from a vPro dongle received at a docking station will bypass the Thunderbolt controller when communicating on the SMBus with the host PCH controller.

The method begins at 422 where the docking station may detect a PCIE NIC for remote active management technology such as vPro connected to a USB type C or other high capacity connector of the docking station. In an example embodiment, signaling may be sent to detect if a vPro or similar PCIE NIC is attached for out-of-band remote management communication in the connected device to the high capacity connector. In another embodiment, the device detection and identification under the plug and play aspects of the USB standard for type-C and other USB connections may identify the presence of a vPro or similar PCIE NIC for remote active management communication as understood by those of skill.

Similar to FIG. 4A at 424, receipt of the identification of a vPro or similar PCIE NIC in an attached device at the USB type C connector of the docking station will trigger an embedded controller to execute instructions to activate multiplexer switching on data to bypass the Thunderbolt controller in the docking station for sideband SMBus data such as vPro or other out-of-band active management signals. The MCTP vPro or other out-of-band active management signals will be routed around the Thunderbolt controller via a plurality of multiplexers activated by the indication of the vPro PCIE NIC.

At 426, the connected device to the USB type C connector, such as a vPro dongle or similar device enabling wired out-of-band active management communication with the host device, will provide vPro signals via a high capacity cable connection to a multiplexer in the docking station. In the previous example, multiplexer 344 receives the vPro communication and data in an embodiment. At 428, the vPro or other out-of-band active management signals are demultiplexed at the multiplexer from USB type C USB 2.0 pins which support the SMBus from the dongle. At 430, the vPro or other out-of-band active management signals are removed from the USB type C bus in the docking station and routed to a second multiplexer on the bypass connection. Such a bypass connection may be a conductive trace on PCB or a wire or other conductor suitable for the SMBus signaling between the first and second multiplexer in the docking station. In the example of FIG. 3, the bypass connection 346 may be used to transport the bypassed SMBus data for the designated MCTP bus between multiplexers 344 and 342. The multiplexers, as stated above, may be I2C bus switches in an example embodiment.

At 432, the second multiplexer may remultiplex the vPro or other out-of-band active management signals of the designated MCTP bus onto the USB type C bus that may carry Thunderbolt data or other USB or display data from the bypassed Thunderbolt controller. Such vPro or other out-of-band active management signals may be remultiplexed onto the USB 2.0 pins of the USB type 2.0 pins for transport across a single cable to the host information handling system.

At 434, the vPro or other out-of-band active management signals may be transmitted across the primary USB type C connector and cabling to the host information handling system connected to the docking station according to an embodiment. In a further aspect, the transmitted vPro or other out-of-band active management signals may then be received by the host information handling system and demultiplexed and communicated along the continued designated MCTP bus to the PCH controller and management engine of the host information handling system.

While the methods described above recite a flow of operation, it is understood that variations are contemplated in the present disclosure including that nothing recited herein requires a particular order of the flow of operation of the intelligent configuration management system. Operation may be performed in any order or simultaneously. For example, FIG. 4A and FIG. 4B recite a flow of communication and data between a host information handling system and a vPro or similar dongle and the reverse flow respectively. It is understood that not all steps may be performed in some embodiments. For example, once the vPro or other out-of-band active management PCIE NIC is detected, the bypass for the MCTP designated bus for the vPro or other out-of-band active management signals may be established and the bypassing may operate without the steps of activating the bypass. It is also understood that additional steps not recited here may be performed or that steps recited in other portions of the specification may be substituted or otherwise performed in any order.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a chipset including controllers such as a PCH controller, a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such central processor units or other processors provided by companies such as Intel®, AMD®, ARM® and others such that the software and firmware are capable of operating a relevant environment of the information handling system. Other processors, controllers, or other such devices may also have embedded firmware or software capable of operating a relevant environment of an information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system docking station comprising:
   a first universal serial bus (USB) type C port for transceiving SMBus data multiplexed over unused USB-2 pins from a host information handling system;
   a first multiplexer for demultiplexing the SMBus data as a designated data bus to a second multiplexer to create a designated bus for management controller transport protocol data;
   the second multiplexer re-multiplexing the SMBus designated data bus to a second USB type C port for connection with an out-of-band management hardware system network interface card of a device connected to the second USB type C port for communication of the management controller transport protocol data with the host information handling system and bypassing a docking station high capacity connector multiplex controller; and
   an embedded controller for activating the first multiplexer and the second multiplexer upon detecting the connection with the out-of-band management hardware system network interface card via the second USB type C port and establishing the designated bus for management controller transport protocol data bypass connection.

2. The information handling system docking station of claim 1, wherein the first multiplexer is an I2C bus switch.

3. The information handling system docking station of claim 1, wherein the embedded controller detects a plug-in event of the device at the second USB type C port including the out-of-band management hardware system network interface card to activate the first multiplexer and the second multiplexer.

4. The information handling system docking station of claim 1, wherein the SMBus and is also used to deliver data updates to the embedded controller.

5. The information handling system docking station of claim 1, wherein the docking station high capacity connector multiplex controller is a Thunderbolt controller in the docking station receiving Thunderbolt multiplexed data from the first USB type C port.

6. The information handling system docking station of claim 1, wherein the first USB type C port supports Thunderbolt multiplexing and terminates at the docking station high capacity connector multiplex controller to receive pass-through PCIE data and video data.

7. The information handling system docking station of claim 6 further comprising:
   a USB hub and display connector for receiving pass-through PCIE data and video data from Thunderbolt multiplexed data.

8. A computerized method of establishing a designated management controller transport protocol data bus through an information handling system docking station comprising:
   detecting, via an embedded controller, a plug-in event at a second USB type C port connected to a device containing a PCIE network interface card supporting out-of-band management communications;
   establishing the designated management controller transport protocol data bus to bypass a Thunderbolt controller between a first USB type C port and the second USB type C port;
   receiving data of Thunderbolt multiplexed PCIE data and SMBus data formats;
   demultiplexing SMBus management controller transport protocol data at a first multiplexer and routing the SMBus management controller transport protocol data between the first USB type C port and the second USB type C port; and
   passing through remaining Thunderbolt multiplexed PCIE and video data to the Thunderbolt controller.

9. The computerized method of claim 8, wherein a link of the designated management controller transport protocol data bus is established between the first multiplexer and a second multiplexer in the information handling system docking station.

10. The computerized method of claim 9, wherein the first multiplexer is located between the first USB type C port and the Thunderbolt controller and the second multiplexer is located between the second USB type C port and the Thunderbolt controller.

11. The computerized method of claim 8, wherein the first USB type C port is connected to a host information handling system with out-of-band management capabilities.

12. The computerized method of claim 8 further comprising:
   routing the SMBus management controller transport protocol data between the first multiplexer and a second multiplexer to bypass the Thunderbolt controller and establish communication between the device containing the PCIE network interface card supporting out-of-band management communications and a host information handling system through the information handling docking station.

13. The computerized method of claim 12, wherein the first multiplexer is an I2C bus switch.

14. The computerized method of claim 8, wherein the device containing the PCIE network interface card supporting out-of-band management communications is a vPro network dongle device.

15. An information handling system docking station comprising:
- a first universal serial bus (USB) type C port for transceiving data of Thunderbolt formats and SMBus data multiplexed over unused USB-2 pins from a host information handling system;
- a Thunderbolt controller in the information handling system docking station receiving Thunderbolt multiplexed pass-through data from the first USB type C port;
- a first multiplexer between the first USB type C port and the Thunderbolt controller for demultiplexing the SMBus data to a second multiplexer to create a designated management controller transport protocol data bus upon activation of the first multiplexer and the second multiplexer;
- the second multiplexer re-multiplexing the designated management controller transport protocol data bus to a second USB type C port for connection with an out-of-band management hardware system network interface card for communication of management controller transport protocol data,
- wherein the designated management controller transport protocol data bus bypasses the Thunderbolt controller.

16. The information handling system docking station of claim 15, wherein the Thunderbolt multiplexed pass-through data not demultiplexed at the first multiplexer is demultiplexed at the Thunderbolt controller for delivery to a display port, audio port, or output USB interface.

17. The information handling system docking station of claim 15 further comprising:
- an embedded controller activating the first multiplexer and the second multiplexer to create the designated management controller transport protocol data bus upon detection of the out-of-band management hardware system network interface card for communication of the management controller transport protocol data connected to the second USB type C port.

18. The information handling system docking station of claim 15, wherein the first multiplexer and the second multiplexer are I2C bus switches.

19. The information handling system docking station of claim 17, wherein the embedded controller detects a plug-in event at the second USB type C port connected to a device containing a PCIE network interface card supporting out-of-band management communications.

20. The information handling system docking station of claim 15 wherein an embedded controller detects a plug-in event at the second USB type C port of a vPro network dongle device.

* * * * *